V. HENRI, A. HELBRONNER & M. VON RECKLINGHAUSEN.
TREATMENT OF WATER AND OTHER LIQUIDS BY ULTRA VIOLET RAYS.
APPLICATION FILED OCT. 31, 1910. RENEWED AUG. 13, 1917.

1,266,803.

Patented May 21, 1918.
5 SHEETS—SHEET 1.

WITNESSES:

by their Attorney

INVENTORS
V. Henri, A. Helbronner,
and M. v. Recklinghausen.

UNITED STATES PATENT OFFICE.

VICTOR HENRI, ANDRÉ HELBRONNER, AND MAX von RECKLINGHAUSEN, OF PARIS, FRANCE, ASSIGNORS, BY MESNE ASSIGNMENTS, TO THE R. U. V. COMPANY, INC., A CORPORATION OF NEW YORK.

TREATMENT OF WATER AND OTHER LIQUIDS BY ULTRA-VIOLET RAYS.

1,266,803.     Specification of Letters Patent.     Patented May 21, 1918.

Application filed October 31, 1910, Serial No. 589,995. Renewed August 13, 1917. Serial No. 186,052.

*To all whom it may concern:*

Be it known that we, VICTOR HENRI and ANDRÉ HELBRONNER, citizens of the Republic of France, and MAX VON RECKLINGHAUSEN, a subject of the Emperor of Germany, residing at Paris, France, have invented the new and useful Improvement Relating to the Treatment of Water and other Liquids by Ultra-Violet Rays, of which the following is a specification.

This invention relates to the treatment and sterilization of liquids by means of ultra-violet rays, and particularly to the sterilization of such liquids as are only slightly or not at all opaque to the rays, and has for its object the construction of apparatus suitable for the purpose.

Sterilization apparatus of two different types has been previously described in the first of which the source of ultra-violet rays is located above the liquid to be sterilized, and in the second of which the source of the rays is submerged in the liquid. In the first case, which can be applied in a simple way only to liquids which are not under pressure, some of the rays are emitted in directions other than toward the liquid which is being sterilized, and therefore the apparatus is not as efficient as would otherwise be the case. On the other hand, in apparatus where a lamp constituting the source of rays is itself submerged in the liquid which is being sterilized it necessarily operates with a very low efficiency on account of the cooling of the lamp by the liquid; moreover the lamps are not easily accessible and it is also difficult to cause them to start automatically by the magnetic tilting method. Furthermore, when water is being sterilized deposits of mineral matter of a similar nature to boiler crusts are formed on the lamp tube which interfere with the passage of the ultra-violet rays.

In our application for Letters Patent Serial No. 565611 we have described apparatus in which the liquid, for instance, water, is sterilized by means of sources of ultra-violet rays which are placed above the liquid and in our application for Letters Patent Serial No. 565612 we have described a method of sterilizing liquids in which the source of the ultra-violet rays is immersed in the same, and in the preferred form of construction the mercury vapor lamp used as a source for the rays is inclosed in a quartz envelop, the space between the lamp and the outer envelop being exhausted to a high vacuum.

The present invention relates to improvements in the broad idea of treating liquids with ultra-violet rays by means of sources of ultra-violet rays located either above the liquid or in the liquid and in accordance therewith we shall now proceed to describe a number of forms of apparatus in which these improvements are embodied. This apparatus is particularly adapted to the treatment of water for the purpose of sterilizing the same.

Referring to the forms of apparatus in which the source of the ultra-violet rays is located above the liquid, it is important that a number of principles should be carefully observed. The ultra-violet rays emitted by the lamp should be utilized to their fullest extent in order that the cost of sterilization may be kept as low as possible; this can be achieved by providing the lamps which emit the ultra-violet rays with reflectors, and by making or covering the walls of the chambers in which the water is treated with a highly reflecting surface, such as polished metal or glazed porcelain.

Now it will be obvious that as the ultra-violet rays penetrate more deeply into the water, they become less active and therefore the parts of the water nearest the ultra-violet rays will be acted upon to a greater extent than those parts which are farther away. In order, therefore, to secure uniformity of action on the total bulk of water treated, it is desirable to provide means for circulating the water through the apparatus, so that all parts of the same are acted upon to the necessary extent, and as far as possible to an equal degree. For this reason the water should in many cases be circulated to and fro within the sphere of action of the ultra-violet rays and guides or baffle plates may be provided for the purpose. Care should be taken, however, to so arrange the parts that such guides or baffle plates do not shelter any parts of the water from the rays. This object can generally be accomplished by arranging the baffle plates in a radial direction with reference to the position of the source of the ultra-violet rays employed.

A further point which should be observed in the construction of the plant is the fact that particles of solid matter in the water are apt to shelter the microbes from the rays unless provision is made for thoroughly agitating the water in order that the solid particles are turned over many times so that every side of each solid particle may come within the influence of the ultra-violet rays. For this reason the apparatus is constructed so that the water is thoroughly agitated by means of baffle plates which cause eddy currents to be generated in the current of water or which impart a rotary or swirling movement to the same, and in some cases miniature waterfalls are created so that the water is well agitated.

It will be apparent that the bactericidal effect of the ultra-violet rays will be all the more energetic the nearer the bacteria are to the source of the rays. In sterilizing a current of water flowing through a trough it is therefore desirable to regulate the duration of exposure of each component part of the current according to its distance from the source of rays. If all the liquid were to flow underneath a lamp at a uniform speed, the duration of exposure would need to be regulated so as to completely sterilize those parts of the liquid which pass farthest remote from the lamp and this would cause an excessive expenditure of energy for the liquid immediately below the lamp. For the sake of economy it is therefore desirable to regulate the speed of the current of water in such a manner that the liquid nearest to the source of the rays flows at a greater speed than liquid which is more remote from said source.

In the course of our researches on this subject, we have discovered that different kinds or species of bacteria possess very different degrees of susceptibility to the ultra-violet rays, and in particular we have found that certain pathogenic bacteria namely the germs of cholera, typhoid and coli are more susceptible than are the innocuous organisms; that is to say, if a substance in which both classes of organisms are present is subjected to the influence of ultra-violet rays, the pathogenic organisms mentioned will be killed in a shorter time than the others. Whether this law be absolutely true as regards all bacteria and similar low organisms or not we have not yet determined experimentally, but it appears to hold in regard to the organisms which are generally found in liquids such as water, milk, and fermented liquids such as beer, wine, cider, perry, vinegar and others produced by alcoholic, lactic and acetic fermentation, and it is also true for all kinds of yeast and other fungi which are employed as organized ferments in the fermentations referred to.

In accordance with our invention we make use of this discovery by subjecting the liquids or ferments to the action of ultra-violet rays for a comparatively short period of time, which is not sufficient to render them absolutely sterile but which will kill substantially all the pathogenic microbes that may be present. The time necessary can be determined by ordinary experimental means by examining what microbes remain in the liquor after various periods. In our process to make the water potable, we shall expose it twenty seconds to the action of ultra-violet rays and more generally only a fraction of the time necessary for the sterilization; this lowers naturally in a great proportion the cost of making water potable.

It should be understood that the apparatus constructed in accordance with this invention is equally suitable for making the water absolutely sterile, or for making it potable, that is to say, free from pathogenic bacteria, but still containing bacteria which are harmless to human life, for it is only a matter of altering the time factor or the rate of flow of the water through the plant.

As indicated above in sterilizing a current of liquid flowing through a trough it is desirable to regulate the duration of exposure of each component part of the current according to its distance from the source of the rays, and this also applies in the case of a closed conduit. Baffle plates may therefore be arranged at suitable positions in the conduit; the liquid passing above, below, or at the side of said baffle plates. The shape of the baffle plate can be made so as to obtain a frictional retardation of the liquid wherever it is required. The conduit itself may also be narrowed down near the lamps and widened out away from the lamps, so that the speed of the liquid is greatest just as it is passing a lamp and in that part of the conduit in immediate proximity to the lamp.

In order that the nature of our invention may be clearly understood, we will now proceed to describe the same with reference to the accompanying drawings in which Fig. 21 is a modified form of construction in sectional elevation while Fig. 22 is a sectional view on the line IX—IX of Fig. 21.

Figure 1:
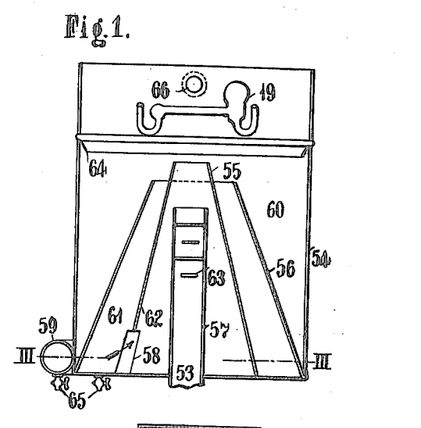
Figure 1 is a sectional elevation on the line II—II of Fig. 2, showing a sterilizing unit adapted for a water supply, Fig. 2 being a horizontal section of the same on the line III—III of Fig. 1.
Figure 2:
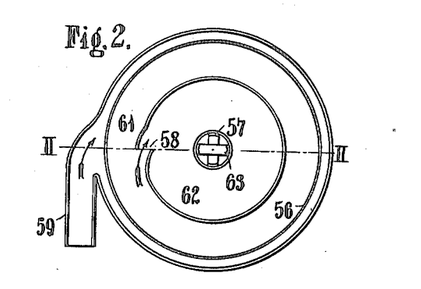

The form of apparatus shown in Figs. 1 and 2 comprises a cylindrical tank 54 in the upper part or cover of which the lamp 19 is located. In the lower part of the apparatus partitions or baffles 55 and 56 are arranged in the form of truncated cones lying one within the other, the innermost 55 of these cones being preferably made of the greater height. A centrally located tube 57 leads from the innermost cone through the bottom of the tank and forms the delivery pipe to the apparatus. One or more apertures 58 are provided in certain of the inner cones to permit the water to pass therethrough. The inlet for the water is shown at 59 and is so arranged that water is admitted to the outer compartment 60 of the tank in a tangential direction so that it flows through the compartment with a circular motion until it reaches such a height that it flows over the edge of the outermost cone 56 into the inner compartment 61, where the rotary motion is continued. At the bottom of this compartment it passes through the aperture 58 into a central compartment 62 where it rises until it overflows into the delivery tube 57 and flows away from the outlet 53. The delivery tube is provided with cross baffle plates 63 for the purpose of checking too violent rotary motion of the liquid. Near the top of the cylindrical tank a baffle plate 64 is arranged to prevent the water creeping up the sides of the apparatus into the cover of the same. As shown in Fig. 1 the lamp 19 is located in such a position that the light proceeds approximately from the apex of the truncated cones so that the baffle plates 55 and 56 do not cast shadows and the light has free access to all parts of the liquid. The circular motion which is given to the water as it passes through the apparatus causes it to be thoroughly agitated which, as has already been pointed out, is necessary in order that the liquid may be efficiently sterilized. In order to insure the greatest possible movement of the liquid, the apparatus is arranged so that the water flows past one baffle plate at or near the top, and past the next baffle plate at or near the bottom and so on alternately. Drain cocks 65 are provided in order that the apparatus may be emptied at any time when it is not required for use so that the water may not get stagnant therein. A window is provided as shown at 66 in order that the operation of the lamp may be watched.

In a sterilizing element of this type the water flows through the apparatus by virtue of the pressure in the water mains and may be collected in a cistern. The cover of the tank is not hermetically sealed so that the lamp operates in air at ordinary atmospheric pressure and no device is necessary for making up any deficiency of air. If desired the lamp may be mounted on a frame in such a way that it can be tilted from the outside of the apparatus without removing the cover of the tank.

Figure 3:
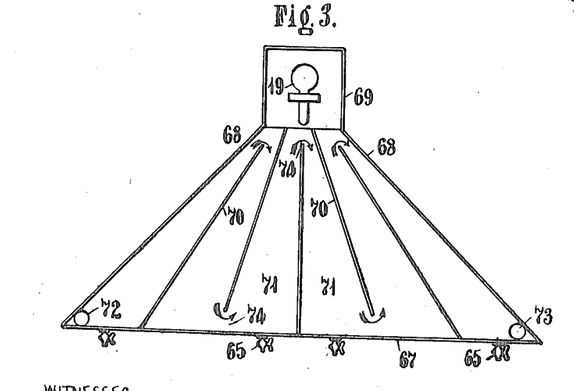
Figs. 3 and 4 and Fig. 5 are sectional elevations of three further modifications.
Figure 4:
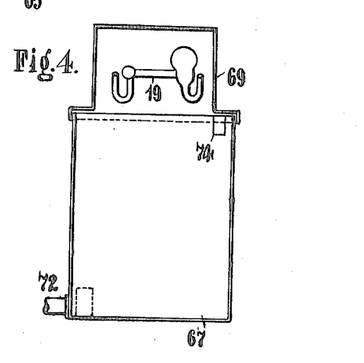

In another form of construction Figs. 3 and 4, the container or tank has a rectangular base 67, two of the sides 68 converging toward the hood 69 where the lamp 19 is located. Baffle plates 70 are arranged in a radial direction from the lamp toward the base of the apparatus so as to form a number of compartments 71. The water enters near the bottom of the tank at 72 and passes successively through the compartments 71 until it reaches the outlet 73. The apertures 74 leading from one compartment to the next are arranged alternately in the top and bottom of the baffle plates 70. Drain cocks 65 are also provided for emptying the chambers of water when the apparatus is not in use.

Figure 5:
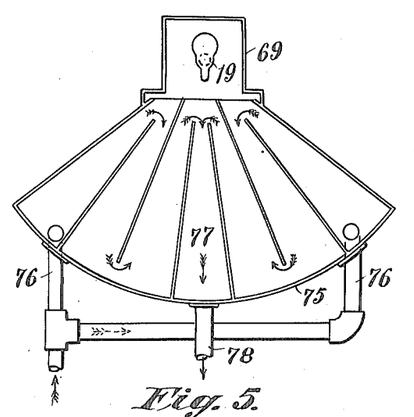

In the modification of the apparatus shown in Fig. 5 the tank has a curved base 75, the liquid being admitted by the two inlets 76 into the two outermost compartments. The water flows through the various chambers as shown by the arrows toward the center of the sterilizing element until it reaches the innermost compartment 77 from whence it flows away by the outlet 78.

Figure 6:
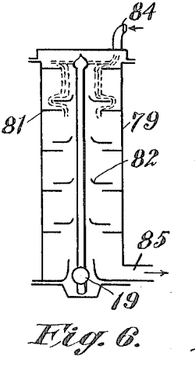
Figs. 6 and 7 are sectional elevations of a type of construction in which the water is adapted to pass by gravity near a vertically arranged lamp.

In Fig. 6 the sterilizing element takes the form of a vertical tubular tank 79, a lamp 19 being suspended vertically approximately in the middle of the same. The construction of the apparatus is adapted to provide the necessary agitation of the water while under the influence of the ultra-violet rays without causing obstructions which might prevent the rays from reaching some part of the liquid. Furthermore the water is made to pass the lamp in close proximity thereto so that sterilization can be rapidly effected. Around the walls of the tank baffle plates 81 and 82 are arranged at right angles to the lamp tube and located in sets so that the baffle plates overlap one another to a considerable extent. The water enters at the top of the apparatus at 84 and flows through the tank, falling from one baffle plate on to the next underneath until it reaches the outlet 85. A series of miniature waterfalls is thus obtained so that the water is thoroughly agitated while it is being submitted to the action of the rays and the apparatus will be particularly useful where the water to be sterilized contains a comparatively large quantity of solid matter in suspension.

Figure 7:
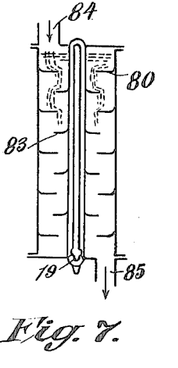
Figure 8:
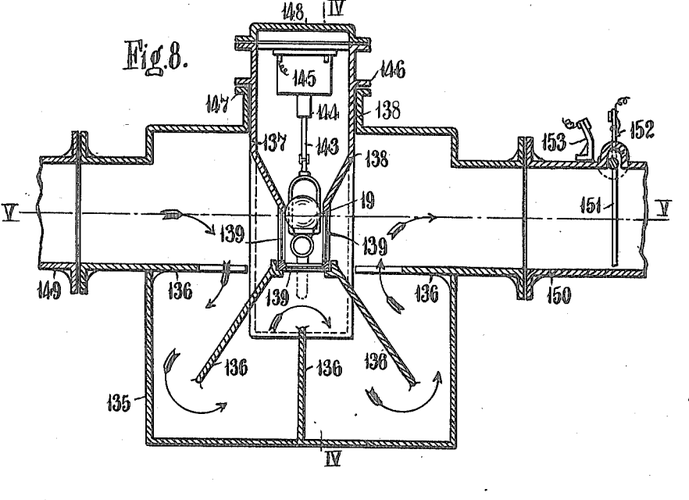
Fig. 8 shows in vertical section a sterilizing element provided with a separate removable chamber for the lamp.
Figure 9:
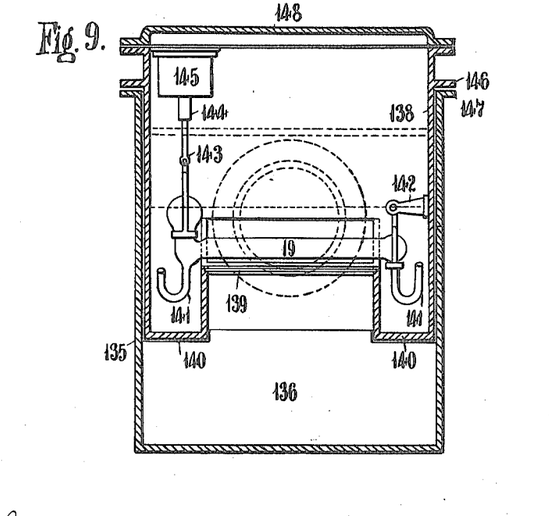
Fig. 9 being a vertical section on the line IV—IV of Fig. 8.
Figure 10:
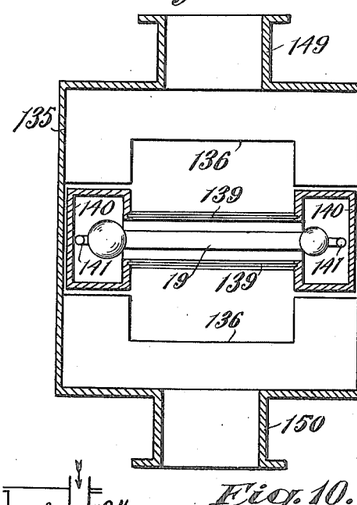
Fig. 10 is a horizontal section on the line V—V of Fig. 8
Figure 11:
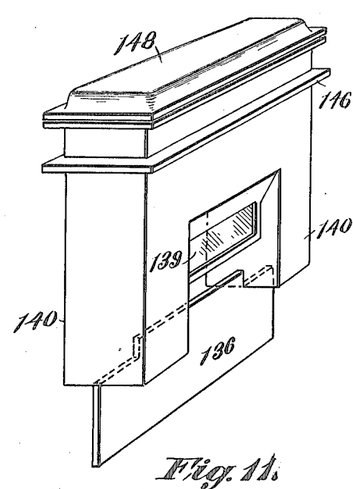
Fig. 11 is a view in perspective of the lamp chamber and one of the baffle plates separated from the remaining parts of the apparatus.

In a modified form of construction shown in Fig. 7 the lamp 19 is surrounded by means of an envelop 86 made of material permeable to the ultra-violet rays such as mica or quartz, and the baffle plates 80 and 83 are alternately mounted on the walls of the tank and the envelop respectively. In this construction the water to be sterilized in passing through the apparatus, generally fills the same and the baffle plates serve to give the necessary motion to the liquid to secure thorough sterilization. The space between the lamp and its envelop 86 will preferably be exhausted of air in order to prevent the lamp from being cooled by the water and vice versa the water from being unduly heated by the lamp. Furthermore, the exhaustion of the intermediate space has the advantage that absorption of ultra-violet rays by the air is prevented so that the full power of the rays is utilized.

The sterilizing element shown in Figs. 8 to 11 comprises an outer chamber or casing 135 provided with baffle plates 136 for guiding the water in a circuitous path through the apparatus. This chamber is provided with an opening 137 at the top through which the lamp chamber 138 is inserted. The lamp chamber 138 is constructed to accommodate the lamp 19 which is arranged longitudinally in the lower part. The lamp chamber is narrowed alongside the luminous tube of the lamp and is provided with three quartz windows 139, one at each side and one underneath the lamp, or these three sides may be replaced by one quartz channel. Pockets 140 are provided for receiving the two ends 141 of the lamp. The lamp 19 is pivotally suspended at one end by means of a collar from the bracket 142 mounted on the wall of the lamp chamber. The other end of the lamp is pivotally connected to a rod 143 which is attached to the armature 144 of an electro-magnet 145 also mounted in the lamp chamber. The lamp chamber is provided with flanges 146 adapted to fit closely over the edges 147 of the opening of the sterilizing chamber and a cover 148 is provided for the top of the lamp chamber. The liquid, water for example, is admitted to the apparatus through the opening 149 and flows in the direction shown by the arrows until it reaches the outlet 150. In the outlet pipe of the apparatus is a swinging baffle plate 151 adapted to fully close the section of the water pipe and arranged to operate a spring contact member 152. When the flow of water is started the baffle plate is deflected and the movable member comes into contact with a fixed contact 153 and closes the circuit of the lamp. The automatic tilting apparatus then operates and the lamp is thus started. An advantage of this construction which is of considerable importance commercially is that the lamp chamber is readily removed from the remainder of the apparatus so that the quartz windows can be cleaned and attended to when necessary and the lamp is very easily accessible.

It will be observed that the baffle plates 136 are arranged radially from the lamp so that no shadows are formed and the liquid which is being sterilized is at all times directly exposed to the ultra-violet rays.

Figure 12:
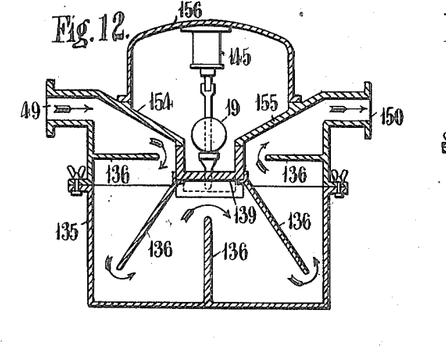
Figs. 12 and 13 show in vertical section modifications of the apparatus shown in Fig. 8 and Figs. 14 and 15 illustrate the manner in which the lamp chamber or quartz windows are attached to the sterilizing chamber.

In Fig. 12 there is shown a modified form of construction of the apparatus above described with reference to Figs. 8 to 11. It comprises a sterilizing tank 135 provided with baffle plates 136. The top of the sterilizing tank is formed by two sides 154 and 155 which slope downward toward the middle, leaving an opening where the quartz channel or windows 139 is or are mounted. The lamp chamber or hood 156 is mounted on the sterilizing tank with hermetically tight joints and is constructed so that it can be removed from the sterilizing tank 135 and the lamp 19 is mounted therein, an automatic electro-magnetic tilting device 145 being provided for operating the lamp at starting. If desired a vacuum may be created in the lamp chamber. The liquid, for instance water, is admitted through the inlet 149 and passes in the direction shown by the arrows through the apparatus, whereby it is exposed to the ultra-violet rays emitted by the lamp which penetrate through the window 139. The liquid after sterilization is delivered through the outlet 150.

Figure 13:
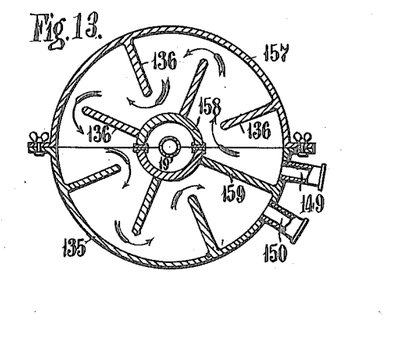

Fig. 13 shows a development of the forms of construction already described with reference to Figs. 8 to 12. In this case the chamber 157 has a cylindrical form and the lamp 19 is supported in a chamber or tubular window 158 located axially in the middle of the cylindrical chamber. Baffle plates 136 are provided alternately on the walls of the tank and the lamp chamber as shown. The inlet 149 is situated near to the outlet 150 but separated therefrom by the partition 159 so that the liquid in passing through the apparatus makes a complete circle around the lamp chamber, and at the same time makes a circuitous or zigzag path as shown by the arrows, on account of the baffle plates 136. The sterilizing chamber 157 and the lamp chamber 158 may be divided longitudinally as indicated for convenience in assembling the parts in position around the lamp.

Figures 14, 15, 21, 22:
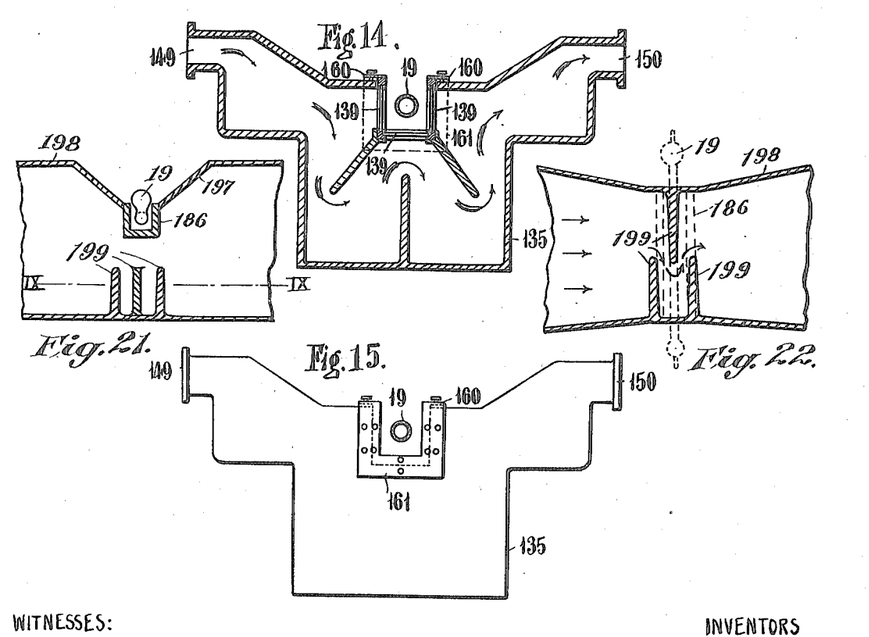

Figs. 14 and 15 show how a lamp chamber somewhat similar to that illustrated in Fig. 12 may be secured in the sterilizing tank. The upper flange 160 is bolted to the edges of the sterilizing tank and side flanges 161 are provided on the ends of the lamp chamber which project through the sides of the tank, these side flanges being clamped to the sides of the tank with suitable packing to prevent leakage.

Figures 16, 23:
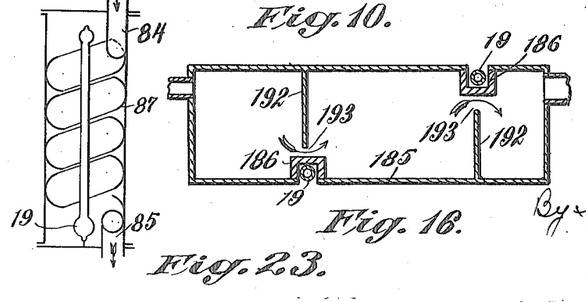
Fig. 16 is a modified form of the apparatus shown in vertical section which is provided with baffle plates for regulating the speed of the liquid, Fig. 17 being a vertical section of a modified form of construction
Fig. 23 is a modified form of the devices shown in Figs. 6 and 7.

As hereinbefore mentioned, in order to obtain the greatest efficiency it is desirable to so arrange the apparatus that the speed of the liquid flowing close to a lamp is greater than liquid which is flowing more remote from said lamp. The apparatus should therefore be designed so that the time of exposure is regulated in accordance with the distance of the liquid from the lamp. Fig. 16 shows a method of accomplishing this object. Opposite each of the channels 186 in which the lamp tube is mounted a baffle plate 192 is arranged with passages 193 near to the channels 186. The liquid, as it flows through the openings where the cross section is reduced, will have a greater speed than in the main portion of the conduit. In Fig. 16 there is also shown a feature which has been demonstrated by practical experience to be of great importance and value. It was a discovery of ours that liquids which are permeable to ultra violet rays, such as perfectly clear water, cannot completely and effectively be sterilized by a source of ultra violet rays, unless while exposed to such rays, it is agitated so that no bacteria can remain in the shadow of particles impervious to such rays and thus escape the germicidal effect of the rays. To effect such complete sterilization, therefore, the agitation or turning over and over of the liquid under treatment must be very thorough.

Figure 17:
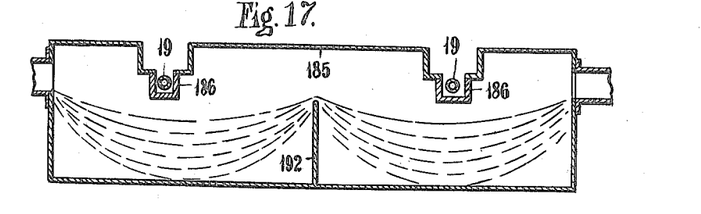

By the use of baffle plates, such as shown in Fig. 16, this result is accomplished to a very perfect degree, but in this figure we have also shown a plurality of lamps or sources of ultra violet rays, placed at different positions with reference to the flowing stream of liquid so that their rays combine to produce an illuminated zone. So, therefore, even if the agitation be not complete, all portions of the water will be exposed to the rays, the lamps themselves or the casings in which they are contained constituting baffles or obstructions to the flow of the liquid and assist in the turning over of the water. This use of a plurality of sources of rays may be, of course, extended indefinitely, with the most advantageous results. Fig. 17 shows a modified form of construction in which baffle plates 192 are mounted midway between the adjacent lamp channels 186, and the liquid flowing above the baffle plates and just below the lamp channels will have a greater speed than that flowing at the bottom of the recesses between adjacent baffle plates 192. By this means the speed of the liquid in different parts of the conduit is so regulated that all parts of the liquid are exposed for a sufficient period of time to become sterilized without any part being subjected to an excessive expenditure of energy.

Figure 18:
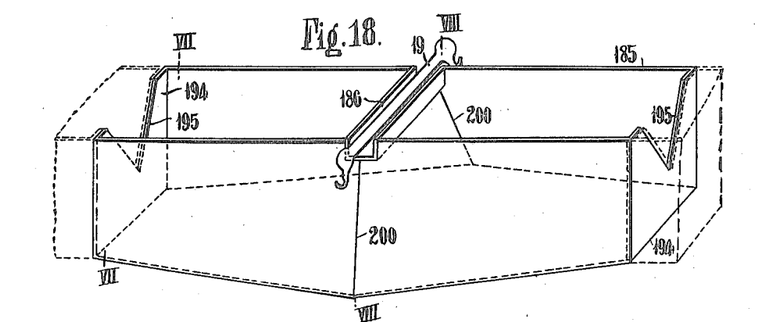
Fig. 18 is a perspective view of a sterilizing conduit adapted to regulate the speed of the liquid which is being treated, Fig. 19 being a cross section on the line VII—VII of Fig. 18, and Fig. 20 being a cross section on the line VIII—VIII of Fig. 18.
Figure 19:
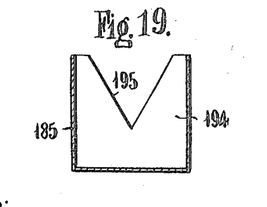
Figure 20:
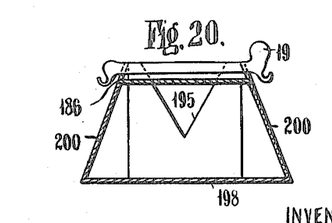

Another form of apparatus for achieving this object is shown in Figs. 18, 19, and 20, in which the sterilizing chamber comprises a trough or conduit 185 through which the liquid to be treated is caused to flow. The lamp 19 is supported in a channel 186 which is constructed wholly or in part of a material such as quartz which is permeable to the ultra-violet rays. If it is assumed that the part of the lamp which emits the rays in the greatest concentration is located approximately over the middle of the conduit, the liquid at the surface immediately below the middle of the lamp will be exposed to rays of greater activity than the liquid at the sides and bottom of the conduit. In order to cause the liquid near the surface to flow more rapidly than the liquid at the bottom of the trough, baffle plates 194 are arranged in the conduit having a triangular notch or gate 195 therein, the apex of which is situated in the lower part of the baffle plate as shown. The upper part of the liquid will flow through the wide opening at a greater speed than the lower part of the same, which flows through the reduced opening and where greater friction is offered to the progress of the current of liquid. The cross section of the conduit immediately below the lamp is trapezoidal in form, as shown in Fig. 20, that is to say, the sides 200 converge toward the lamp channel 186. Where the baffle plates are located the cross section of the conduit is rectangular and the cross section gradually changes from a trapezoid to a rectangle and vice versa between the position of the lamp channel and baffle plates. Since in the neighborhood of the lamp the conduit is wider at the bottom than it is at the top the liquid will flow more rapidly just below the lamp than at the bottom which is farther from the lamp and where the ultra-violet rays are less effective.

In the form of construction shown in Fig. 21 the cover of the sterilizing conduit 198 slopes down, as shown at 197, toward the lamp channel 186. The bottom of the chamber is provided with corrugations or baffle plates 199 which provide a circuitous path for the liquid flowing at the bottom of the conduit, as shown in Fig. 22. Thus the liquid flowing immediately under the lamp has a free passage whereas liquid at the bottom of the trough is obstructed by the corrugations or baffle plates and caused to flow slowly.

In the alternative form illustrated by Fig. 23 the baffle plates are substituted by a helical groove 87 on the walls of the tank so that the liquid passes in a spiral direction around the lamp, from the inlet 84 until it flows away through the outlet 85.

It will be obvious that other methods of achieving the same results may be devised and that two or more of the above methods for regulating the speed of the liquid may be combined, depending upon the nature of the liquid to be treated by means of ultra-violet rays and the time of treatment necessary. We therefore do not limit ourselves to the particular forms of construction above described which are only intended to illustrate and explain the nature of our invention, and we wish it to be understood that reasonable developments and modifications of such constructions fall within the scope of the same.

Throughout this specification and the appended claims we have used the term sterilization in connection with apparatus suitable for carrying out this object, but we wish it to be understood that we claim the use of the various forms of apparatus herein described and modifications thereof for treating liquids generally with ultra-violet rays. Furthermore, in connection with the treatment of water it is sometimes advantageous, as indicated above, to carry out a partial sterilization, that is to say, sufficient to destroy the noxious organisms but to leave many of the innocuous bacteria unharmed, and such treatment is considered to be included under the term sterilization.

What we claim is:—

1. The method of sterilizing liquids by the action thereon of ultra violet rays, which consists in causing a body of liquid to pass through a receptacle in the field of such rays and under the direct sterilizing influence of the same, and carrying the said liquid, in the form of a rapidly moving film, in the immediate vicinity of the source of the rays while passing from one portion of the receptacle to another.

2. The method of sterilizing liquids by the action thereon of ultra violet rays, which consists in causing the liquid to flow through compartments in a receptacle in the field of such rays and under the direct sterilizing influence of the same and carrying said liquid, in the form of a thin and rapidly moving film, across the region in immediate proximity to the source of rays in its passage from one of the compartments to another.

3. The method of sterilizing liquids by the action thereon of ultra violet rays, which consists in passing a body of the same through a receptacle and carrying the liquid in a thin and rapidly moving film through the region in the immediate vicinity of the source of rays and under the direct sterilizing influence of the same, and agitating the liquid during its passage through the receptacle, whereby all portions of the same will be exposed to the sterilizing influence of the rays.

4. The method of sterilizing liquids by the action thereon of ultra violet rays, which consists in passing a body of such liquid through a receptacle in the field of such rays, and under the direct sterilizing influence of the same, causing the liquid to pass through the region in the immediate vicinity of the source in a thin and rapidly moving film, and to flow in large and more sluggish masses at points more remote therefrom, whereby opportunity will be given to expose all portions of the liquid to sterilizing action while passing through the apparatus.

5. The method of sterilizing liquids by the action thereon of ultra violet rays, which consists in passing a body of such liquid through a receptacle in the field of such rays and under the direct sterilizing influence of the same, causing the liquid to pass through the region in the immediate vicinity of the source of rays in a thin film with a swirling motion, and toward and from such region in a more slowly moving mass whereby all portions of the liquid will be exposed to the action of the rays.

6. The method of sterilizing liquids herein described, which consists in passing a body of such liquid in proximity to and under the direct influence of a plurality of sources of ultra violet rays placed in different position with reference to the line of flow, whereby the liquid will be subjected to the effect of rays acting in more than one direction thereon.

7. The method of sterilizing liquids herein described, which consists in passing a body of such liquid in proximity to and under the direct influence of a plurality of sources of ultra violet rays placed in different positions with reference to the line of flow, and maintaining the liquid in its passage in agitation, so that all parts of the same will be subjected to the effect of such rays acting thereon in more than one direction.

8. The method of sterilizing liquids herein described, which consists in passing a body of liquid through the zone or region of the combined or intersecting rays from a plurality of sources of ultra violet rays arranged in different positions with reference to the flow of such liquid.

In testimony whereof we have hereunto subscribed our names this 17th day of October, 1910.

VICTOR HENRI.
ANDRÉ HELBRONNER.
MAX von RECKLINGHAUSEN.

Witnesses:
H. C. COXE,
JOHN BAKER.